United States Patent [19]

Hilgren

[11] Patent Number: 5,429,753
[45] Date of Patent: Jul. 4, 1995

[54] HVAC HEAT TRANSFER FLUID RECYCLING

[75] Inventor: Wallace L. Hilgren, Edina, Minn.

[73] Assignee: Kleer-Flo Company, Eden Prairie, Minn.

[21] Appl. No.: 334,436

[22] Filed: Nov. 3, 1994

Related U.S. Application Data

[63] Continuation of Ser. No. 31,099, Mar. 11, 1993, abandoned.

[51] Int. Cl.[6] .............................................. B01D 35/16
[52] U.S. Cl. ...................................... 210/805; 210/808; 210/195.2; 210/257.2; 210/258; 210/416.5
[58] Field of Search ............ 210/799, 805, 252, 257.1, 210/257.2, 258, 416.1, 416.5, 194, 195.2, 808

[56] References Cited

U.S. PATENT DOCUMENTS

| | | |
|---|---|---|
| 4,372,849 | 2/1983 | Klauck ................ 210/416.5 |
| 4,528,093 | 7/1985 | Winer . |
| 4,692,251 | 9/1987 | Hilgren . |
| 4,929,351 | 5/1990 | Sanborn . |
| 4,946,595 | 8/1990 | Miller, Jr. . |
| 5,057,658 | 10/1991 | Cano et al. ............ 210/416.5 |
| 5,075,002 | 12/1991 | Thalmann et al. ........ 210/416.5 |
| 5,091,081 | 2/1992 | Hilgren . |
| 5,102,549 | 4/1992 | George et al. ................ 210/639 |

Primary Examiner—Robert A. Dawson
Assistant Examiner—W. L. Walker
Attorney, Agent, or Firm—Merchant, Gould, Smith, Edell, Welter & Schmidt

[57] ABSTRACT

In an HVAC system, an apparatus and method cleanses glycol-containing heat transfer fluid from the HVAC system in a batch process. Heat transfer liquid is admitted to the apparatus from a low pressure side of the system. The heat transfer fluid is filtered in a batch process and returned to a high pressure side of the HVAC system.

14 Claims, 5 Drawing Sheets 5,429,753

HVAC HEAT TRANSFER FLUID RECYCLING

This is a Continuation of application Ser. No. 08/031,099, filed Mar. 11, 1993, now abandoned.

BACKGROUND OF THE INVENTION

1. Field of the Invention

This invention pertains to heat transfer fluid cycling. More particularly this invention pertains to an apparatus and method for cleaning heat transfer fluid in an HVAC system.

2. DESCRIPTION OF THE PRIOR ART

Heating, ventilating and air conditioning (HVAC) systems commonly utilize closed loop systems for pumping heat transfer fluid throughout a building. In such a closed loop system, a central air conditioner or boiler forces heat transfer fluid through piping which is then returned to the air conditioner/boiler. In such systems, glycol is a primary component of the fluid.

After continued use, the heat transfer fluid becomes contaminated with particulate matter or other contaminants. Also, the glycol can break down losing its usefulness and presenting a maintenance hazard to the pipes. As a result, it has become necessary to add glycol to a system and, from time to time, to clean the heat transfer fluid contained within the HVAC system. By cleansing the heat transfer fluid, corrosion and related maintenance problems can be reduced. Also, a clean HVAC system reduces a danger of biological contamination and may even cut power costs.

In industrial applications (e.g., a school), an HVAC system may contain as much as 10,000 gallons of heat transfer fluid. Prior art techniques for cleansing a heat transfer fluid within a system would include simply removing the old heat transfer fluid and disposing it. New heat transfer fluid is then substituted into the system. However, such disposal is environmentally unacceptable. Alternatively, the heat transfer fluid can be drained from the system and cleansed. However, due to the large volume of heat transfer fluid in an HVAC system, this procedure is not commonly practical. Also, if the system is drained, air pockets can result in the piping when fluid is readmitted.

It is an object of the present invention to provide an apparatus and method for cleansing glycol containing heat transfer fluid within an HVAC system without interruption of the systems normal operation.

SUMMARY OF THE INVENTION

According to a preferred embodiment of the present invention, a method and apparatus for cleansing heat transfer fluid in an HVAC system is disclosed. The method includes drawing off a portion of heat transfer fluid from a low pressure side of the HVAC system. The drawn off portion is then cleansed in a batch process. The cleansed portion is then admitted under pressure to a high pressure side of the HVAC system.

DESCRIPTION OF THE PREFERRED EMBODIMENT

Referring now to the several drawing figures in which identical elements are number identically throughout, a description of the preferred embodiment will now be provided.

Figure 3:
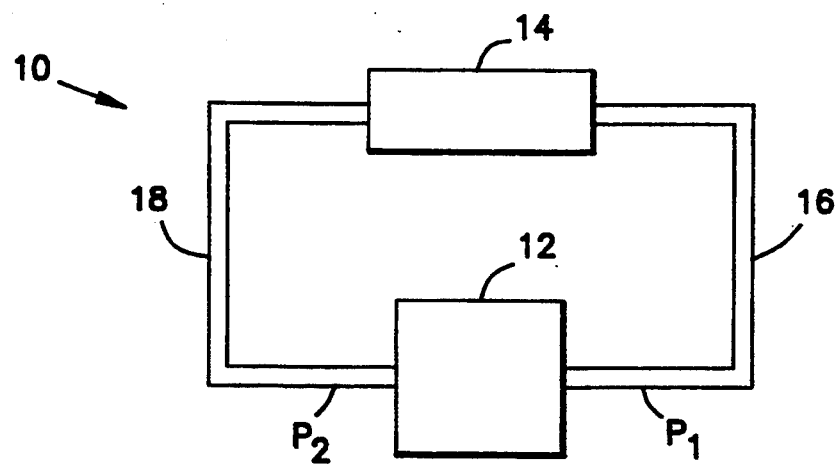
FIG. 3 is a schematic view of a prior art HVAC system.

With initial reference to FIG. 3, a prior art HVAC system 10 is schematically shown. The system 10 includes a main HVAC pump 12. The system 10 also includes a heat transfer unit 14 which may be heat transfer coils, heating and cooling loops or the like.

In a commercial environment, the heat transfer unit 14 may be distributed throughout a building with the pump 12 centrally positioned in a boiler room or the like. A supply conduit 16 connects an outlet of the pump 12 with an inlet of the heat transfer unit 14. A return conduit 18 connects an outlet of the heat transfer unit 14 with an inlet of the pump 12.

As shown, the HVAC system 10 is a closed loop system. In such systems, a heat transfer fluid containing glycol is pumped from the pump 12 through supply conduit 16 to the heat transfer unit 14. After the heat transfer, the heat transfer fluid is then returned to the HVAC pump 12 through the return line 18. The pressure of the fluid within the supply conduit 16 is at a first pressure $P_1$ greater than a pressure $P_2$ of fluid within the return conduit 18. $P_2$ is greater than ambient atmospheric pressure.

Figure 4:
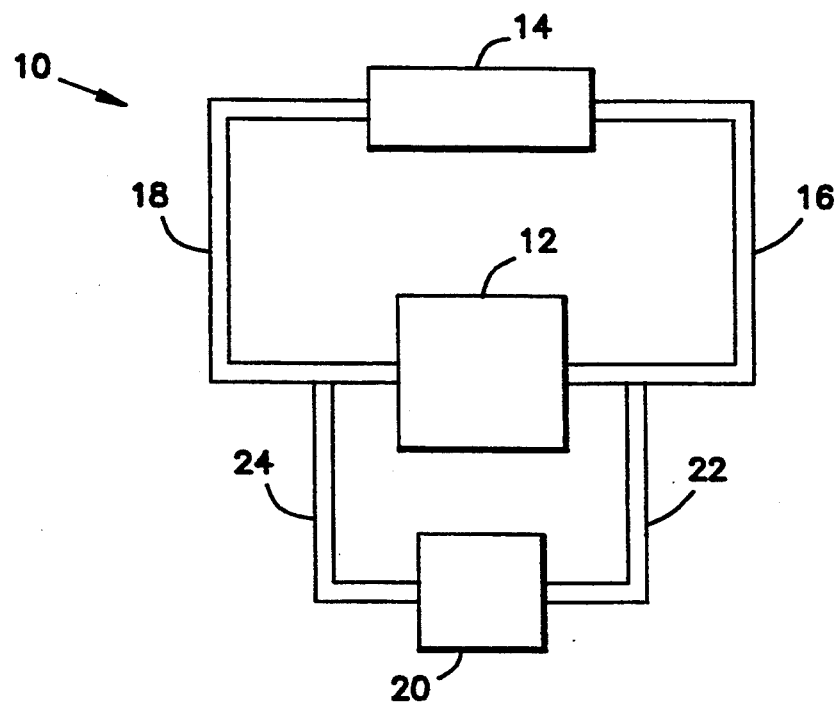
FIG. 4 is the view of FIG. 3 with an apparatus of the present invention included.

The present invention includes a cleaning apparatus 20 installed as schematically shown in FIG. 4. An outlet conduit 22 connects the apparatus 20 to the supply conduit 16. An inlet conduit 24 connects the apparatus 20 to the return conduit 18.

To connect conduits 22,24 to conduits 16,18, any suitable valves can be placed within conduits 16,18. Preferably, such valves will include couplings for attaching conduits 22,24 as well as having shut-off valves for permitting conduits 22,24 to be decoupled from the system 10 while permitting fluid flow through conduits 16,18 when the apparatus 20 is not in use.

Figure 1:
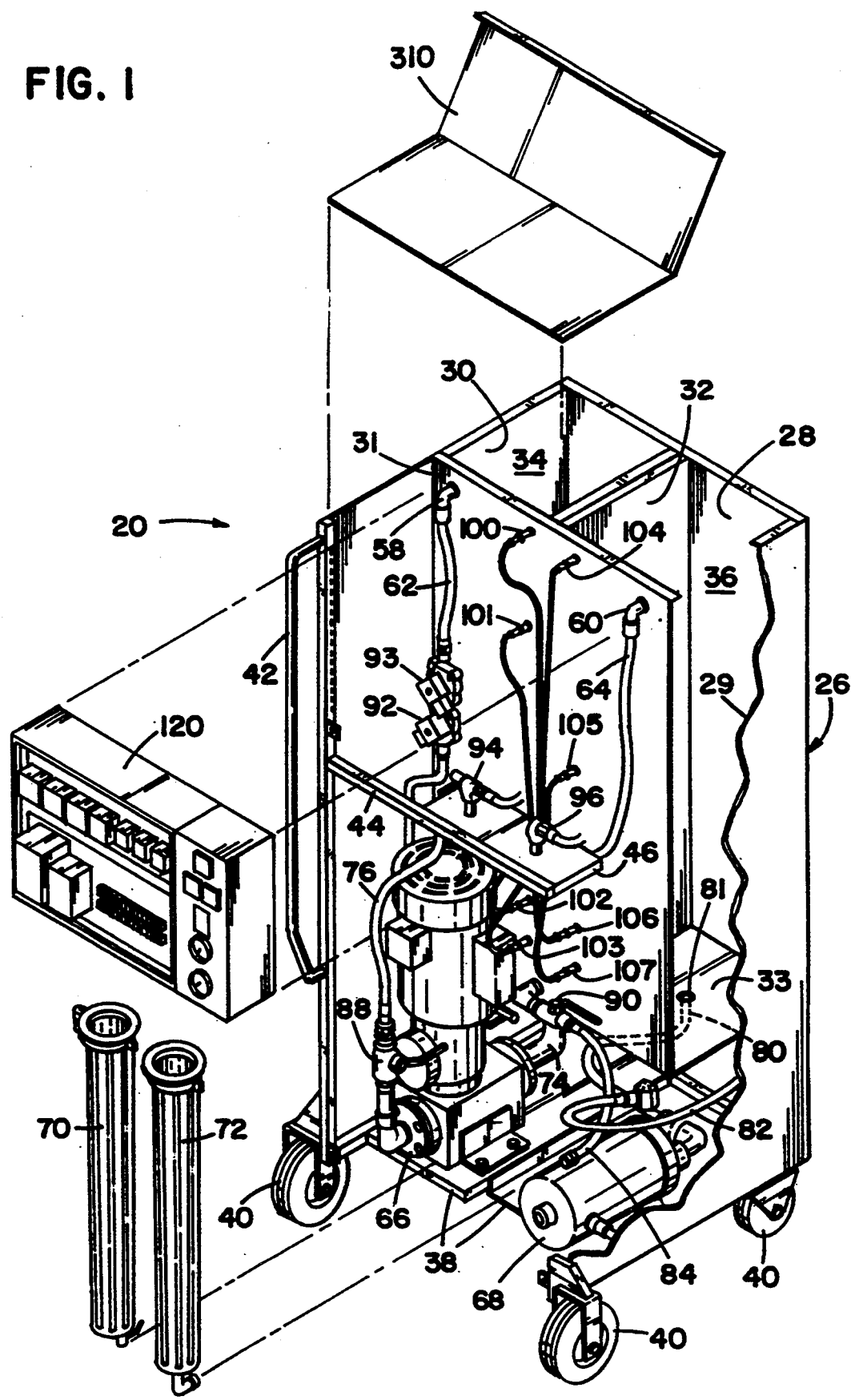
FIG. 1 is a perspective, exploded and partially cutaway view showing an apparatus according to the present invention.

With attention now to FIG. 1, the apparatus 20 includes a housing 26 having a rear wall 28, a right wall 29 and a left wall 30. Extending between walls 29,30 (and approximately half way through the depth of the walls 29,30) is a transverse intermediate wall 31 parallel to wall 28. A dividing wall 32 extends between walls 31 and 28. A first base 33 extends from a bottom portion of walls 31,32 and joins walls 28,29, and 30. The walls 28–33 cooperate to define a first tank 34 and a second tank 36 each of approximately equal volume and each open to atmosphere at their upper ends.

The housing 26 also includes a second or lower base 38 extending between walls 29,30 on which various hardware will be mounted as will be described. Casters 40 are secured to the lower portion of the housing 26 to permit the housing 26 to be moved between locations as desired.

Preferably, the dimensions of the housing 26 are selected such that the housing 26 may pass through common sized door openings which are typically two and a half to three feet wide in commercial installations. A handle 42 is secured to the housing 26 to permit an operator to grasp the unit 20 and move it about on casters 40. In FIG. 1, due to the partial breakaway of wall 29, only handle 42 is shown attached to wall 30. It will be appreciated that an additional handle will be attached to wall 29 such that an operator may grasp the unit in two locations for ease of movement.

As shown in FIG. 1, the walls 30,29 extend forward from intermediate wall 31. A dividing bar 44 extends between walls 30,29. A mounting plate 46 is secured to dividing bar 44. The mounting plate 46 receives and retains various components as will be more fully described.

Figure 2:
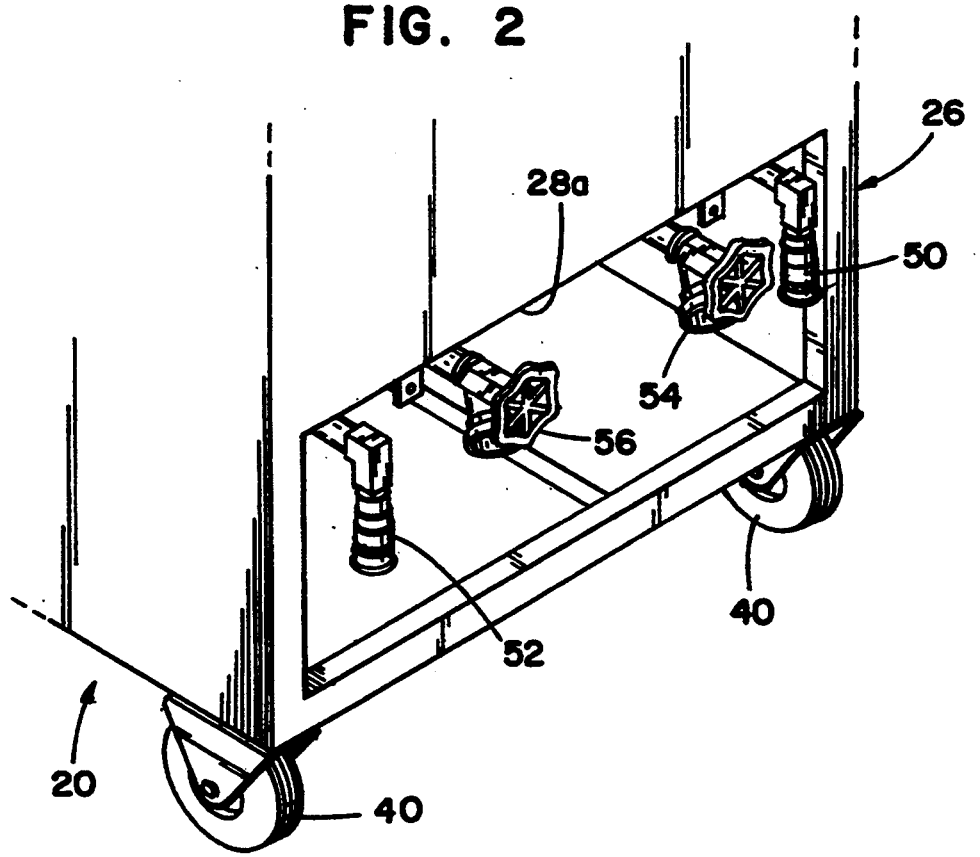
FIG. 2 is a perspective view of a bottom rear of the apparatus of FIG. 1.

With reference to FIG. 2, the lower back of the unit 20 is shown. Exposed through an opening 28a of wall 28, are an inlet coupling 50 and an outlet coupling 52. Couplings 50,52 may be releasably connected to conduits 24,22 (FIG. 4), respectively. Also exposed through opening 28a is a dirty fluid valve outlet 54 and a clean fluid outlet valve 56 for draining tanks 34,36, respectively.

With reference back to FIG. 1, a first elbow coupling 58 is provided adjacent an upper end of first tank 34. As a result, fluid admitted to the coupling 58 is discharged into the interior of tank 34 at its upper end. Similarly, a second elbow coupling 60 is provided near an upper end of tank 36 to discharge fluid into an upper end of tank 36.

Hosing 62 connects first elbow coupling 58 to inlet coupling 50. Hosing 64 connects coupling 60 to an outlet of an ultra-filtration filter 72 as will be more fully described.

The hardware of the apparatus 20 includes a first pump 66 and a second pump 68. The apparatus further includes a first filter 70 and a second filter 72. The first filter 70 is preferably a five micron filter for filtering out particulate material and coagulated glycol. Second filter 72 is preferably an ultra-filtration filter for cleansing glycol. Use of filters including ultrafiltration filters for cleaning glycol heat transfer fluids is shown in commonly assigned U.S. Pat. No. 5,091,081.

A conduit 74 connects an outlet drain 76 (see FIG. 5) on the bottom of tank 34 to an inlet of first pump 66. A conduit 76 connects an outlet of pump 66 to an inlet of first filter 70. A conduit 78 (FIG. 5) connects an outlet of first filter 70 with an inlet of the ultra-filtration filter 72. Conduit 64 connects a permeate side output of ultrafiltration filter 72 with an inlet at the upper end of tank 36. A conduit 80 connects an outlet drain 81 at the bottom of tank 36 with an inlet of second pump 68. Finally, a conduit 82 provided with a check valve 300 (FIG. 5) connects the outlet of pump 68 with outlet coupling 52.

Ultra-filtration filter 72, as is common, includes a condensate outlet and a permeate outlet. The permeate outlet is connected via conduit 64 to tank 36 such that fluid cleansed by ultra-filtration filter 72 is sent to tank 36. The condensate outlet of ultra-filtration filter 72 is connected via a hosing 84 to a lower inlet 86 (FIG. 5) of tank 34.

Preferably, pump 66 is a positive displacement pump with sufficient power to force dirty HVAC heat transfer fluid through filters 70,72. A pump 66 having a maximum output pressure of 40 psig is preferred. Pump 68 must achieve an output pressure greater than P1 in conduit 16 (FIG. 4). Presently, a pressure of 75 psig is preferred for the maximum output of pump 68.

As shown in FIG. 1, manual shutoff valves 88,90 are provided on conduits 76,84 for shutting off flow through the conduits 76,84. Further, first and second solenoid actuated flow control valves 92,93 are provided to control flow of fluid in conduit 62 from inlet 50 to tank 34. Valves 92,93 are automatically actuated as will be more fully described.

The filters 70,72 are mounted to the mounting bracket 46. Each of the filters 70,72 is provided with pressure sensors 94,96 to measure pressure of fluid into the inlets of the filter 70,72 through conduits 76,78, respectively, to display the pressure on a main control box 120.

A plurality of fluid level sensors 100–107 are provided within each of tanks 34,36. The plurality includes a dirty fluid overflow level probe 100 positioned near a predetermined maximum desired fluid level for tank 34. Also disposed within tank 34 is a dirty fluid high level probe 101 positioned beneath probe 100. Adjacent the bottom of tank 34 is a first dirty fluid low level probe 103. Immediately above probe 103 is a second dirty fluid low level probe 102.

Within clean tank 36 is a clean fluid overflow level probe 104. Positioned beneath probe 104 is a clean fluid high level probe 105. Positioned adjacent the bottom of tank 36 is a first clean fluid low level probe 107. Positioned within tank 36 immediately above probe 107 is a second clean fluid low level probe 106. Probes 100–107 are commercially available probes for detecting fluid levels.

The probes 100–107 are connected to the main control box 120. Also, operating switches for the pumps 66,68 are controlled by control box 120. Control box 120 contains control circuitry including control relays having activating magnets (referred to herein as relays) controlling switches. All of such equipment is commercially available and readily understood by one of ordinary skill in the art.

Figure 5:
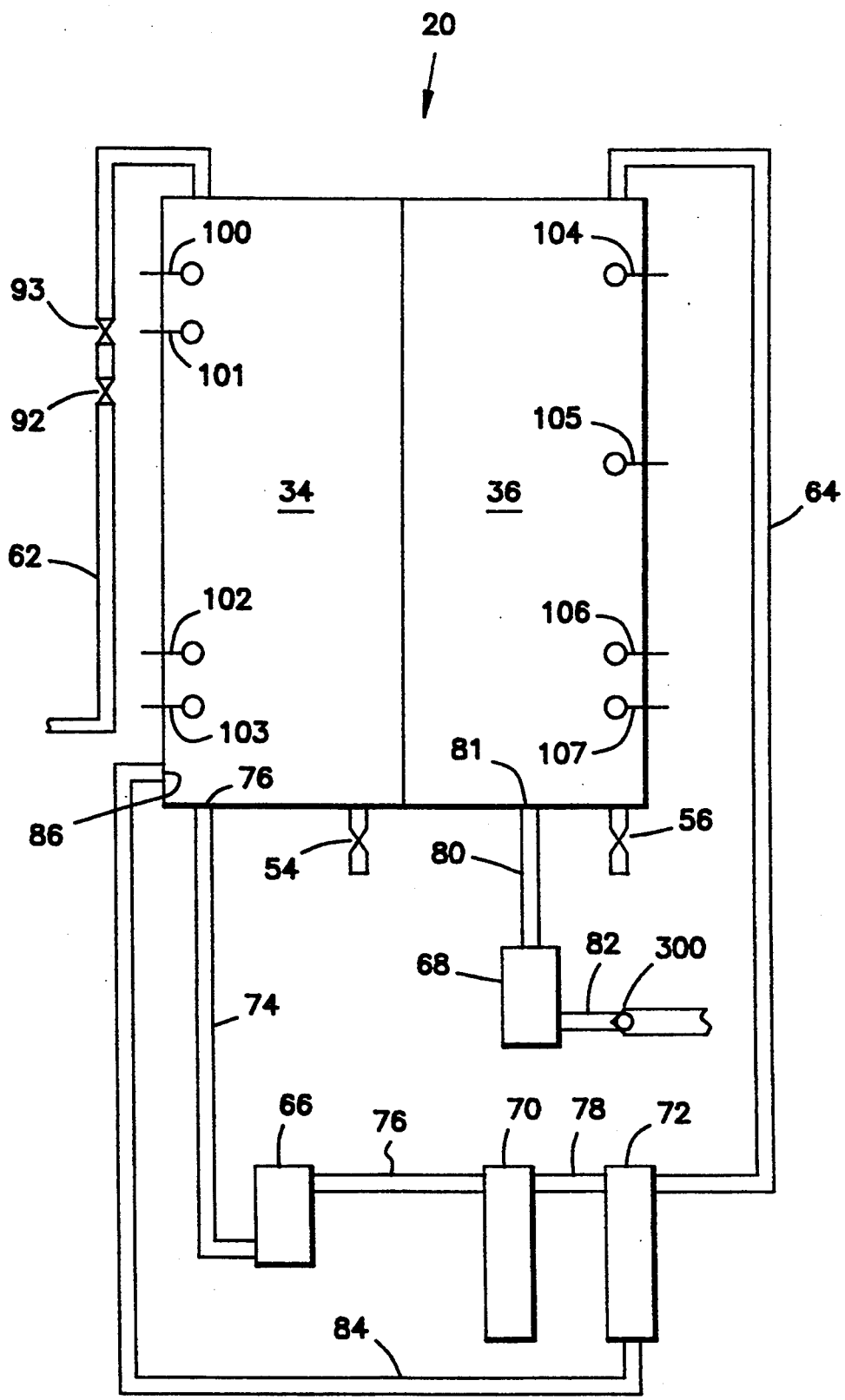
FIG. 5 is a schematic view showing the apparatus of the present invention.
Figure 6:
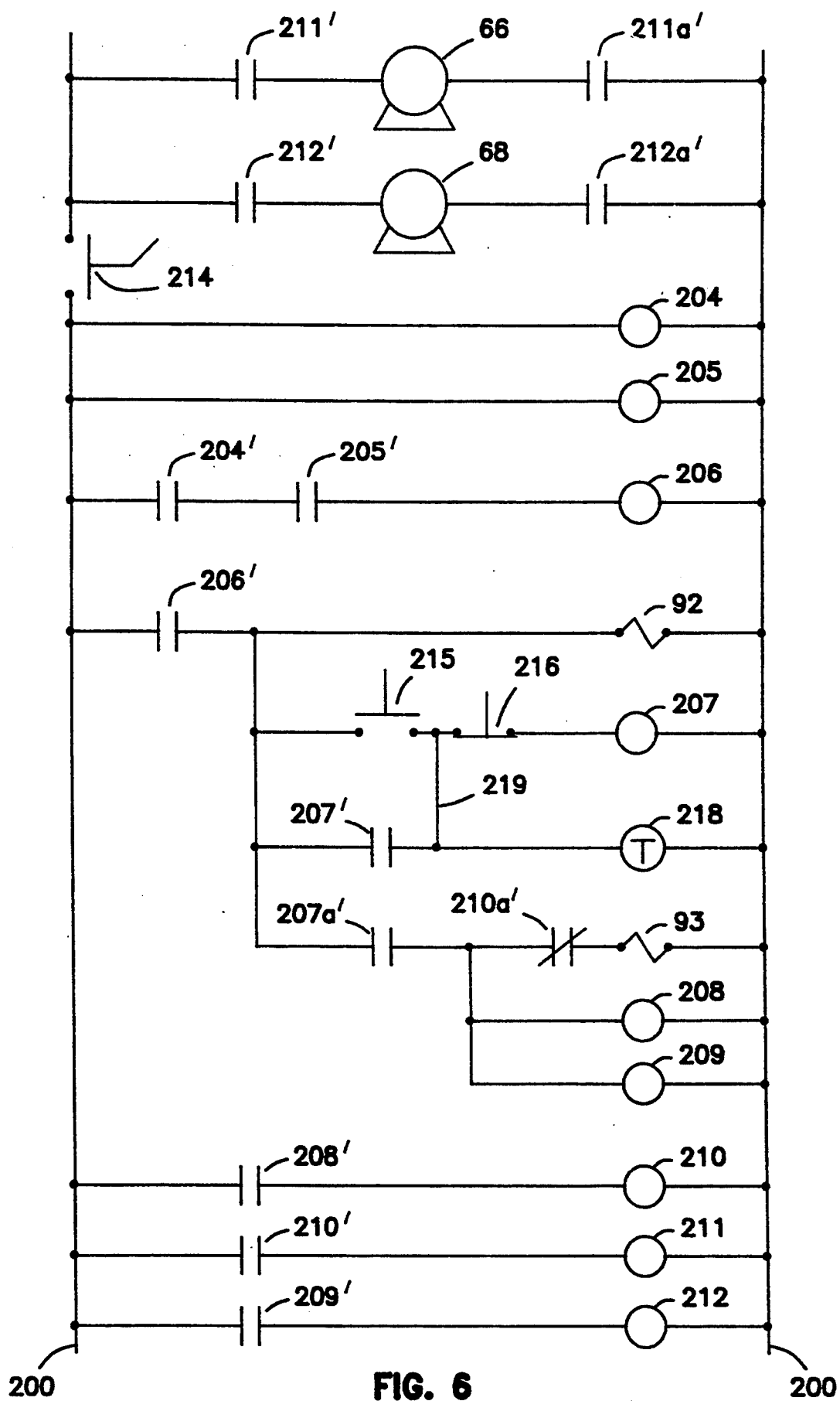
FIG. 6 is a schematic view of control circuitry for use with the present invention.

The control circuit of the present invention can best be understood with reference to FIGS. 5 and 6. FIG. 5 is a schematic showing the piping and valving of the apparatus 20. FIG. 6 is an electrical schematic of the control circuit for the apparatus 20. It will be well understood by those skilled in the art that preparing a control box 120 having the function of the apparatus as herein described and is well within the scope of a person of ordinary skill in the art.

As schematically shown in FIG. 6, the motors of pumps 66 and 68 are electrically wired across an electrical potential represented by conductors 200,202. Also connected across the potential of conductors 200,202 are a plurality of control relays including relays 204–212.

Relays 204,206 control normally open switches 204'–206', respectively. Relay 207 controls normally open switches 207',207a'. Relays 208,209 control normally open switches 208',209', respectively. Relay 210 controls normally open switch 210' and normally closed switch 210a'. Relay 211 controls normally open switches 211',211a'. Finally, relay 212 controls normally open switches 212',212a'.

A main power manual off/on throw switch 214 is provided to be manually actuated to permit operation of pumps 66,68. First solenoid valve 92 is connected across the potential of lines 200,202 in series with switch 206'. Relay 207 is connected in parallel with valve 92 and in series with spring biased manual start and stop buttons 215,216.

A timing clock 218 is connected in series with switch 207'. Clock 218 and switch 207' are connected in parallel to relay 207 with clock 218 cross-connected by conductor 219. Conductor 219 keeps relay 207 energized after normally open button 215 is released and until normally closed button 216 is pressed.

Switches 207a'210a' and second solenoid valve 93 are connected in series and, in turn, are connected in parallel to the clock 218 and switch 207'. The clock 218 is a timer which keeps track of the amount of time that the clock 218 is energized.

Connected in parallel with switch 210a' and second solenoid valve 93 are relays 208,209. Relays 210-212 are each connected in series with switches 208',210',209', respectively.

Relay 206 is connected in series with switches 204',205'. Relays 204,205 are each connected across the potential of conductors 200,202. Also connected across the potential of conductors 200,202 are switch 211', motor 66 and switch 211a'. Similarly, switch 212', motor 68 and switch 212a' are connected in series.

With reference to both FIGS. 5 and 6, the probes 100-107 act as control switches for various relays of FIG. 6. Fluid at probe 100 acts as an "off" switch for relay 204 (i.e., fluid at the level of probe 100 turns relay 204 "off"—thereby opening switch 204'—until the fluid level is below probe 100 at which point relay 204 is turned "on"—thereby closing switch 204'). Similarly, fluid at probe 104 acts as an "off" switch for relay 205 (i.e., fluid at the level of probe 104 turns relay 205 "off-"—thereby opening switch 205'—until the fluid level is below probe 104 at which point relay 205 is turned "on" —thereby closing switch 205').

Fluid at probe 101 acts as an "on" switch for relay 210 (i.e., fluid at the level of probe 101 turns relay 210 "on", thereby closing switch 210' and opening switch 210a'). Once relay 210 is "on", it stays "on" even if the fluid level goes below probe 101 until the fluid level goes below probe 103. Fluid at probe 103 acts as an "on" switch for relay 208 (i.e., the absence of fluid at probe 103 turns relay 208 "off" which opens switch 208' causing relay 210 to turn "off" thereby opening switch 210').

Fluid at probe 105 acts as an "on" switch for relay 209 (i.e., fluid at the level of probe 105 turns relay 209 "on"—thereby closing switch 209'). Relay 209, once turned "on", remains on until fluid level falls below probe 107. The absence of fluid at probe 107 turns relay 209 "off" thereby opening switch 209'. Probes 102,106 act as grounding for probes 100,104. It will be appreciated that liquid level probes acting as "on" and "off" switches for relays are well known in the art and form no part of this invention per se.

With the control circuit thus described, the reader will note that relays 204,205 are normally energized resulting in normal closure of switches 204',205'. As a result, relay 206 is normally energized resulting in normal closure of switch 206'. Accordingly, as long as liquid level is below probes 100,104, solenoid valve 92 is operated to be in an open state to permit fluid flow through conduit 60 to be controlled by second solenoid valve 93. Valve 93 is open as long as liquid is below the level of probe 101.

Upon actuation of the start button 215, relay 207 is actuated causing switches 207',207a' to close. This initiates the operation of the clock 218 to indicate elapsed time of operation until switch 207' is opened.

Closure of switch 207a' energizes the second solenoid valve 93 as long as relay 210 is de-energized resulting in switch 210a' remaining normally closed. Also, energization of relay 207 permits relays 208,209 to become energized thereby closing switches 208',209'. Closure of switch 208' energizes relay 210 which closes switch 210'. Closure of switch 210' energizes relay 211 and closure of switch 209' energizes relay 212. Energization of relays 211,212 closes switch pairs 211',211a' and 212',212a', respectively. As a result, pumps 66,68 operate.

In the event liquid level in tank 34 achieves the level of probe 100, an overflow situation exists and relay 204 is de-energized resulting in the entire system shutting off. Similarly, liquid level attaining probe 104 in tank 36 indicates an overflow situation which will open switch 205' and turn off the apparatus 20.

If the liquid level in tank 34 achieves the level of probe 101, relay 210 is in an "on" switched position. Therefore, as long as switch 208' is closed, liquid level above probe 101 permits pump 66 to operate. In the event the liquid level in tank 34 falls beneath the level of probe 103, switch 208' is opened and relay 210 is deenergized resulting in pump 66 being switched off.

In tank 36, if the liquid level rises above probe 105, relay 209 is activated to close switch 209' and to permit pump motor 68 to operate. Liquid level below probe 107 causes relay 209 to switch "off", to open switch 209' and to turn "off" pump motor 68.

From the foregoing, the reader will note that if the liquid level within tank 34 rises to the level of probe 101, pump 66 will switch "on" and remain "on" until the liquid level achieves the level of probe 103 at which point pump 66 will switch "off" and remain "off" until the liquid level returns to the level of probe 101. In the event the level were to achieve the level of probe 100, the entire apparatus 20 will not operate.

Similarly, in tank 36 if liquid level achieves the level of probe 105, pump 68 will operate until such time as the liquid level achieves the level 107 at which time the pump 68 will turn "off" and remain "off" until the liquid level returns to the level 105. In the event the fluid level within tank 36 rises above level 104, the entire apparatus 20 will turn "off".

Solenoid valve 92 permits fluid to enter the tank 34 as long as fluid levels within tanks 34,36 are below the levels of probes 100,104 respectively. Valve 93 permits fluid to enter tank 34 as long as fluid level in tank 34 is below the level of probe 101 and as long as the operator has pressed the start button 215.

As a result of the foregoing, the pumps 66,68 act generally independent of one another. Namely, pump 66 is taking dirty fluid from tank 34 and processing the fluid through the filters 70,72 into tank 36. The transfer operation from tank 34 to tank 36 continues without regard to operation of pump 68 as long as the fluid level within tanks 34,36 is beneath the levels of probes 100,104. Also, during operation, tank 34 is receiving dirty fluid from the HVAC system as long as the fluid level within tanks 34,36 is beneath level of probes 101,104. Pump 68 operates without regard to operation of pump 66 as long as the fluid level within tanks 34,36 is beneath the level of probes 100,104.

With the foregoing apparatus, fluid in an HVAC system can be recycled and cleansed in a batch operation. Tank 34 is constantly filling with dirty fluid which is being cleansed in a batch operation to fill reservoir 36.

The cleaned fluid within reservoir 36 is constantly being pumped back into the HVAC system.

The apparatus 20 includes a control circuitry to prevent accidental dumping of fluid from the HVAC system. Namely, valves 92,93 and check valve 300 prevent uncontrolled discharge of fluid from the HVAC system into the apparatus 20.

In operation, the fluid in the HVAC system is cycled repeatedly through the apparatus 20. As desired, tank 34 may be drained through valve 54 to remove highly concentrated contaminated fluid which may collect beneath the level of probe 103. Also, as desired, additives may be added to the HVAC system by admitting such additives to tank 36 through open cover 310. Finally, filters 70,72 may be removed and replaced with clean filters as desired.

From the foregoing detailed description of the preferred embodiment, is has been shown how the object of the invention has been attained in a preferred embodiment. However, modifications and equivalents of the disclosed concepts, such as those which readily occur to one skilled in the art, are intended to be included within the scope of the claims attached hereto.

What is claimed is:

1. An apparatus for cleansing contaminants from liquid, said apparatus comprising:
    a first holding tank with means for receiving liquid to be cleansed from a source of said liquid;
    means for connecting said first holding tank to said source;
    a second holding tank with means for delivering liquid from said second tank to a desired location of use of said liquid;
    means for connecting said second holding tank to said location;
    filter means for filtering contaminants from said liquid and producing a cleansed permeate and an uncleansed condensate, said filter means having an input for receiving contaminant laden liquid from said first tank and a first outlet for delivering said cleansed permeate to said second tank and a second outlet for returning said uncleansed condensate to said first tank;
    first control means for urging liquid from said first tank, through said filter means and urging said cleansed permeate into said second tank, and said uncleansed condensate into said first tank, said first control means including first pump means for pumping said liquid from said first holding tank into said input, through said filter means, out said first and second outlets and into said holding tanks;
    second control means for urging liquid from said second tank to said desired location, said second control means including second pump means for pumping said liquid from said second holding tank to said location; and
    said first control means includes means for detecting when liquid within said first tank achieves a first predetermined elevation and for urging said liquid from said first tank upon said liquid achieving said first elevation and until said liquid achieves a lower second elevation.

2. An apparatus according to claim 1 wherein said filter means includes an ultra-filtration filter.

3. An apparatus according to claim 2 wherein said ultra-filtration filter has a permeate outlet and a condensate outlet, said permeate outlet comprising said outlet for delivering liquid to said second tank, said condensate outlet connected to said first tank.

4. An apparatus according to claim 1 wherein
    said first control means and second control means both include means for determining when said liquid within either of said first and second tanks exceeds a predetermined overflow elevation with means for disabling said apparatus upon attaining said overflow elevation.

5. An apparatus according to claim 1 wherein said first control means operates independent of said second control means.

6. An apparatus for cleansing contaminants from liquid, said apparatus comprising:
    a first holding tank with means for receiving liquid to be cleansed from a source of said liquid;
    means for connecting said first holding tank to said source;
    a second holding tank with means for delivering liquid from said second tank to a desired location of use of said liquid;
    means for connecting said second holding tank to said location;
    filter means for filtering contaminants from said liquid, said filter means having an input for receiving contaminant laden liquid from said first tank and an outlet for delivering cleansed liquid to said second tank;
    first control means for urging liquid from said first tank, through said filter means and into said second tank, said first control means including first pump means for pumping said liquid from said first holding tank into said input, through said filter means, out said outlet and into said second holding tank;
    second control means for urging liquid from said second tank to said desired location, said second control means including second pump means for pumping said liquid from said second holding tank to said location;
    said first control means includes means for detecting when liquid within said first tank achieves a first predetermined elevation and for urging said liquid from said first tank upon said liquid achieving said first elevation and until said liquid achieves a lower second elevation; and
    said second control means includes means for detecting when liquid within said second tank achieves a third predetermined elevation and urging said liquid from said second tank to said desired location upon attaining said third elevation and until said liquid within said second tank achieves a lower fourth predetermined elevation.

7. An apparatus for cleansing contaminants from liquid, said apparatus comprising:
    a first holding tank with means for receiving liquid to be cleansed from a source of said liquid;
    means for connecting said first holding tank to said source;
    a second holding tank with means for delivering liquid from said second tank to a desired location of use of said liquid;
    means for connecting said second holding tank to said location;
    filter means for filtering contaminants from said liquid and producing a cleansed permeate and an uncleansed condensate, said filter means having an input for receiving contaminant laden liquid from said first tank and a first outlet for delivering said cleansed permeate to said second tank and a second outlet for returning said uncleansed condensate back to said tank;

first control means for urging liquid from said first tank, through said filter means and urging said permeate into said second tank and said condensate into said first tank, said first control means including first pump means for pumping said liquid from said first holding tank into said input, through said filter means, out said first and second outlets;

second control means for urging liquid from said second tank to said desired location, said second control means including second pump means for pumping said liquid from said second holding tank to said location; and said source is a source of glycol based heat transfer liquid having a first predetermined pressure and wherein said desired location is at a higher second predetermined pressure, said first tank having vent means for venting said first tank to atmospheric pressure, said means for receiving liquid to be cleansed including a conduit for connecting said source to said first tank for said first pressure to urge said liquid from said source to said first tank, valve means for controlling flow from said source to said first tank.

8. An apparatus for cleansing glycol based heat transfer liquid, said apparatus comprising:

a first tank with means for receiving liquid to be cleansed from a source of glycol based heat transfer liquid;

a second tank with means for delivering liquid from said second tank to a desired location of use of said liquid;

filter means for filtering contaminants from said liquid, said filter means having an input for receiving liquid from said first tank and an outlet for delivering liquid to said second tank;

first control means for urging liquid from said first tank, through said filter means and into said second tank;

second control means for urging liquid from said second tank to said desired location;

said source of glycol based heat transfer liquid is at a first predetermined pressure and wherein said desired location is at a higher second predetermined pressure, said first tank having vent means for venting said first tank to atmospheric pressure, said means for receiving liquid to be cleansed including a conduit for connecting said source to said first tank for said first pressure to urge said liquid from said source to said first tank valve means for controlling flow from said source to said first tank; and said means for delivering liquid from said second tank to said desired location includes means for pressurizing said liquid to a pressure greater than said second pressure.

9. A method of cleansing heat transfer liquid in a heating ventilating and air conditioning (HVAC) system, said HVAC system including a pump for circulating said fluid in said system, said system including first and second pressure sides on opposite sides of said pump with a pressure in said first side less than a pressure in said second side, said method comprising the steps of:

drawing only a portion of said liquid from said first side into a first tank while leaving a remainder of said liquid circulating within said system;

filtering said portion through a filter to provide a cleansed permeate and an uncleansed condensate and admitting said cleansed permeate to a second tank and returning said uncleansed condensate to be further filtered by said filter;

pressurizing said cleansed permeate from said second tank to a pressure greater than said pressure in said second side and delivering said pressurized cleansed permeate to said second side to dilute said remainder with said cleansed permeate; and repeating said drawing, said filtering and said pressurizing to progressively cleanse said liquid by repeatedly cleansing portions of said liquid and returning said cleansed portions to said system.

10. A method according to claim 9 comprising drawing said portion of said liquid from said first side into said first tank until a level of said liquid within said first tank achieves a first predetermined elevation and, subsequent to achieving said predetermined elevation, forcing said liquid from said first tank through said filter and to said second tank until said liquid level within said first tank is reduced to a second predetermined elevation and, subsequent to achieving said second predetermined elevation, discontinuing said forcing of said fluid from said first tank through said filter.

11. A method according to claim 10 wherein said drawing of said fluid from said first side continues until said level of fluid within said first tank exceeds a predetermined overflow elevation.

12. A method according to claim 9 wherein said filtering is processed through an ultra-filtration filter having a permeate side and condensate side, urging liquid from said condensate side to said first tank and urging fluid from said permeate side to said second tank.

13. A method of cleansing heat transfer liquid in a heating ventilating and air conditioning (HVAC) system, said HVAC system including a pump for circulating said fluid in said system, said system including first and second pressure sides on opposite sides of said pump with a pressure in said first side less than a pressure in said second side, said method comprising the steps of:

drawing a portion of said liquid from said first side into a first tank until a level of said liquid within said first tank achieves a first predetermined elevation;

filtering said portion through a filter to provide a filtered liquid and admitting said filtered liquid to a second tank, said filtering including, subsequent to achieving said predetermined elevation, forcing said liquid from said first tank through said filter and to said second tank until said liquid level within said first tank is reduced to a second predetermined elevation and, subsequent to achieving said second predetermined elevation, discontinuing said forcing of said fluid from said first tank through said filter;

pressurizing said filtered liquid from said second tank to a pressure greater than said pressure in said second side and delivering said pressurized liquid to said second side;

said pressurizing of said liquid from said second tank is initiated upon said liquid within said second tank achieving a predetermined third elevation and continuing said pressurization until said liquid within said second tank is reduced beneath a lower predetermined fourth elevation.

14. A method according to claim 13 wherein admitting of said filtered liquid to said second tank is continued until said second tank liquid level elevation exceeds a predetermined overflow elevation.

* * * * *